(12) United States Patent
Lee et al.

(10) Patent No.: US 11,038,226 B2
(45) Date of Patent: Jun. 15, 2021

(54) SECONDARY BATTERY MODULE

(71) Applicant: Samsung SDI Co., Ltd., Yongin-si (KR)

(72) Inventors: Joon Hyung Lee, Yongin-si (KR); Man Seok Han, Yongin-si (KR); Myung Kook Park, Yongin-si (KR); Seok Joon Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 199 days.

(21) Appl. No.: 16/006,722

(22) Filed: Jun. 12, 2018

(65) Prior Publication Data

US 2019/0020079 A1 Jan. 17, 2019

(30) Foreign Application Priority Data

Jul. 17, 2017 (KR) ........................ 10-2017-0090469

(51) Int. Cl.
| | | |
|---|---|---|
| *H01M 10/658* | (2014.01) | |
| *H01M 10/613* | (2014.01) | |
| *H01M 50/20* | (2021.01) | |
| *H01M 10/647* | (2014.01) | |
| *H01M 50/24* | (2021.01) | |

(52) U.S. Cl.
CPC ....... *H01M 10/658* (2015.04); *H01M 10/613* (2015.04); *H01M 10/647* (2015.04); *H01M 50/20* (2021.01); *H01M 50/24* (2021.01)

(58) Field of Classification Search
CPC ............. H01M 10/613; H01M 10/647; H01M 10/658; H01M 2/1016; H01M 2/1077; H01M 2/1094
See application file for complete search history.

(56) References Cited

U.S. PATENT DOCUMENTS

| 6,146,783 A | 11/2000 | Brohm et al. |
| 8,993,145 B2 | 3/2015 | Muniz |
| 2005/0100728 A1 | 5/2005 | Ristic-Lehmann et al. |
| 2011/0159340 A1* | 6/2011 | Hu ...................... H01M 2/1077 |
| | | 429/120 |

(Continued)

FOREIGN PATENT DOCUMENTS

| CN | 1875060 A | 12/2006 |
| CN | 103333542 A | 10/2013 |

(Continued)

OTHER PUBLICATIONS

Ahn et al., KR 2012-0054389 (May 2012), English Machine Translation.*

(Continued)

*Primary Examiner* — Carlos Barcena
(74) *Attorney, Agent, or Firm* — Lewis Roca Rothgerber Christie LLP

(57) ABSTRACT

A secondary battery module includes a plurality of battery cells aligned in one direction, a plurality of insulation sheets between the plurality of battery cells, the insulations sheets including aerogel for blocking heat transfer between the plurality of battery cells, and a housing fixing the battery cells and the insulation sheets. The secondary battery module may prevent or retard generation of heat or ignition from a cell within the module from propagating to adjoining cells.

7 Claims, 4 Drawing Sheets

(56) References Cited

U.S. PATENT DOCUMENTS

| | | | |
|---|---|---|---|
| 2011/0318621 A1* | 12/2011 | Mineya | H01M 2/08 |
| | | | 429/94 |
| 2013/0344369 A1 | 12/2013 | Miyakawa et al. | |
| 2014/0193685 A1 | 7/2014 | Lim | |
| 2015/0333308 A1 | 11/2015 | Toyoda et al. | |
| 2016/0301045 A1* | 10/2016 | Tyler | H01M 10/058 |
| 2017/0045772 A1 | 2/2017 | You et al. | |
| 2018/0048036 A1* | 2/2018 | Melack | C09D 7/00 |
| 2019/0181399 A1* | 6/2019 | Kaga | H01M 2/10 |

FOREIGN PATENT DOCUMENTS

| | | |
|---|---|---|
| CN | 103443523 A | 12/2013 |
| CN | 104221184 A | 12/2014 |
| CN | 205004375 U | 1/2016 |
| DE | 10 2013 220 174 A1 | 4/2015 |
| EP | 0880190 A2 | 11/1998 |
| JP | 2005-5138 A | 1/2005 |
| JP | 2010-33745 A | 2/2010 |
| KR | 10-2012-0054389 A | 5/2012 |
| KR | 10-2014-0089456 A | 7/2014 |
| KR | 10-2015-0038931 A | 4/2015 |

OTHER PUBLICATIONS

EPO Partial Search Report dated Aug. 21, 2018, for corresponding European Patent Application No. 18181610.9 (14 pages).
EPO Extended Search Report dated Oct. 30, 2018, for corresponding European Patent Application No. 18181610.9 (26 pages).
Chinese Office Action dated Dec. 28, 2020, for corresponding Chinese Patent Application No. 201810729007.5 (8 pages).

\* cited by examiner

FIG. 3

|         | First Cell | Second Cell | Third Cell |
|---------|------------|-------------|------------|
| Example 1 | | | |
| Example 2 | | | |
| Example 3 | | | |

SECONDARY BATTERY MODULE

CROSS-REFERENCE TO RELATED APPLICATION

The present application claims priority to and the benefit of Korean Patent Application No. 10-2017-0090469 filed on Jul. 17, 2017 in the Korean Intellectual Property Office, the entire content of which is incorporated herein by reference.

BACKGROUND

1. Field

Aspects of some example embodiments of the present invention relate to a secondary battery module.

2. Description of the Related Art

Unlike primary batteries that generally cannot be recharged, secondary batteries may be recharged. A low-capacity secondary battery comprised of one single battery cell may be used as the power source for various portable small-sized electronic devices, such as cellular phones, and camcorders. A high-capacity secondary battery in which several tens of battery cells are connected in a battery pack may be used as the power source for motor drives, such as those in hybrid electric vehicles.

Secondary batteries may be configured such that an electrode assembly formed by positive and negative electrode plates with a separator as an insulator interposed therebetween, and an electrolyte, are housed in a case, and a cap plate is coupled to the case. Depending on the external case used, secondary batteries may be classified into different types, for example, pouch type batteries, prismatic batteries and cylindrical batteries. In addition, the electrode assembly housed in the case can be classified into a wound electrode assembly and a stacked electrode assembly depending on the configuration of the electrode assembly.

In addition, when a plurality of batteries are connected to each other in series and/or in parallel, which can be defined as a battery module or a battery pack, the plurality of batteries are accommodated in a standard housing or case to then be electrically connected to an internal or external battery monitoring system.

The above information disclosed in this Background section is only for enhancement of understanding of the background of the invention and therefore it may contain information that does not constitute prior art.

SUMMARY

Aspects of some example embodiments of the present invention relate to a secondary battery module. For example, some example embodiments may include a secondary battery module including a plurality of battery cells aligned in one direction.

Some example embodiments of the present invention include a secondary battery including a mechanism for blocking heat transfer between battery cells in a secondary battery module.

The above and other aspects of the present invention will be described in or be apparent from the following description of example embodiments.

According to an aspect of the present invention, a secondary battery module includes a plurality of battery cells aligned in one direction, a plurality of insulation sheets between the plurality of battery cells, the insulation sheets including aerogel for blocking heat transfer between the plurality of battery cells, and a housing fixing the battery cells and the insulation sheets.

The content of aerogel particles contained in the insulation sheets may range from 80% to 90%. The aerogel particles in the insulation sheets may comprise carbon dioxide ($SiO_2$), also known as silica, and the aerogel particles may have a size ranging from 10 μm to 100 μm. The aerogel particles may include nano-sized pores. Each of the insulation sheets may have a thickness of 0.3 mm. An adhesion tape may be further formed between the battery cells and the insulation sheets. The adhesion tape and the insulation sheet may be formed in a thickness ratio of 1:3.5. A thermal conductivity of the adhesion tape may be 8 to 10 times higher than that of the insulation sheet. The insulation sheets may be formed to be in 1.1% volume relative to the battery cells.

As described above, the secondary battery module according to some example embodiments of the present invention may prevent or retard generation of heat or ignition from a cell within the module from propagating to adjoining cells.

In addition, the secondary battery module according to some example embodiments of the present invention includes aerogel sheets having excellent insulating performance between the battery cells, thereby ensuring lightness in weight and safety.

BRIEF DESCRIPTION OF THE DRAWINGS

FIG. 3 illustrates photographs showing evaluation results of heat transfer of the secondary battery module according to some example embodiments of the present invention.

DETAILED DESCRIPTION

Hereinafter, aspects of some example embodiments of the present invention will be described in more detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc., may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Figure 1:
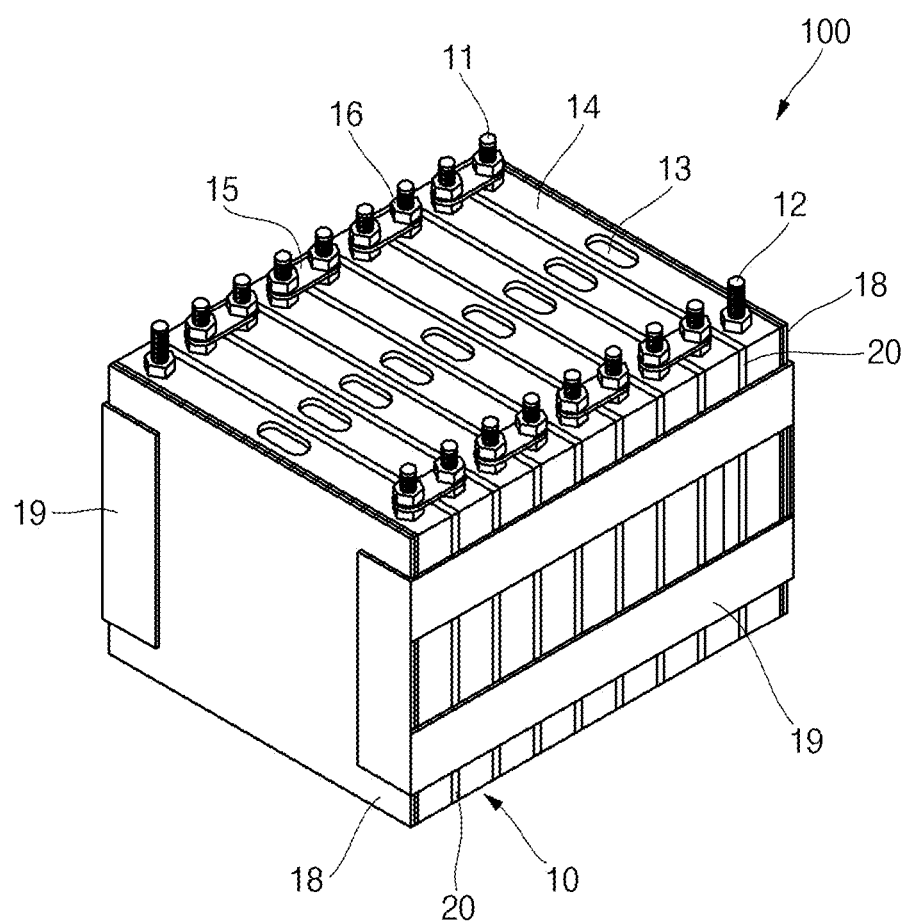
FIG. 1 is a perspective view of a secondary battery module according to some example embodiments of the present invention.
Figure 2:
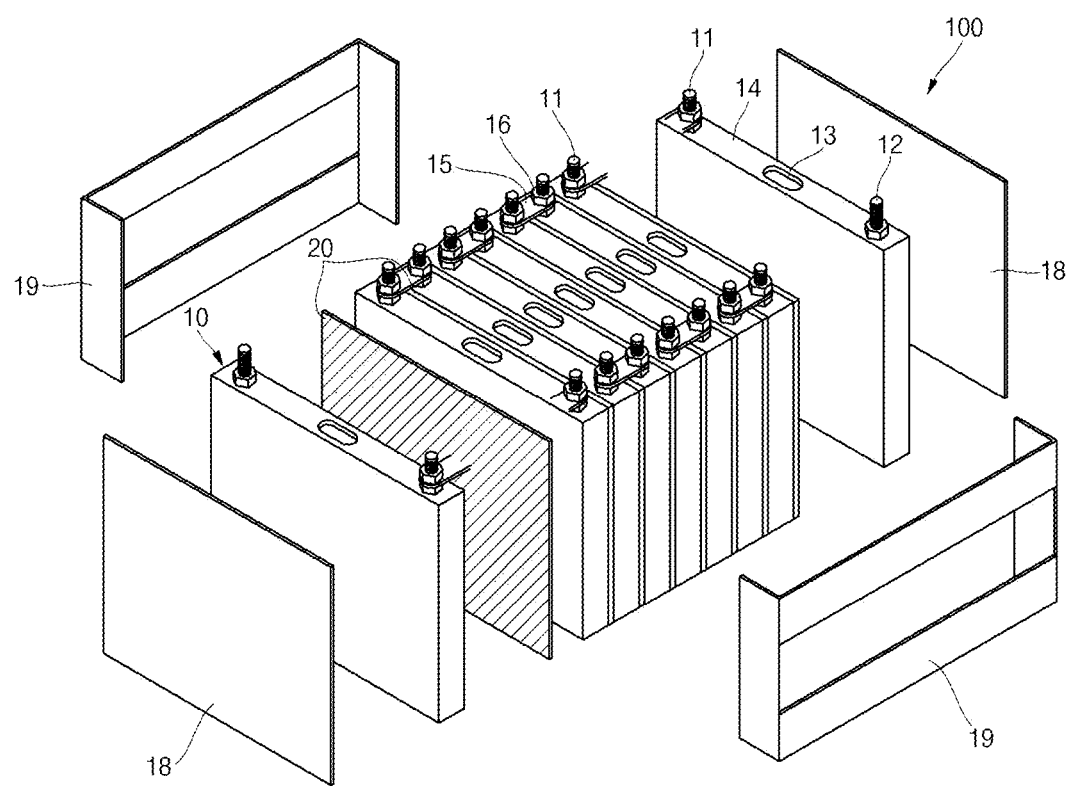
FIG. 2 is an exploded perspective view of the secondary battery module shown in FIG. 1.

FIG. 1 is a perspective view of a secondary battery module according to some example embodiments of the present invention, and FIG. 2 is an exploded perspective view of the secondary battery module shown in FIG. 1.

Referring to FIGS. 1 and 2, the secondary battery module 100 according to some example embodiments of the present invention includes battery cells 10, insulation sheets 20, and housings 18 and 19.

The battery cells 10 are aligned in the secondary battery module 100 along one direction. In one example embodiment, the battery cells 10 may include a plurality of battery cells, which may be horizontally arranged in a line. The battery cells 10 may have a substantially hexahedral shape having two long side regions and four short side regions. Each of the battery cells 10 may include a battery case, and an electrode assembly and an electrolyte accommodated in the battery case. The electrode assembly includes a positive electrode plate, a negative electrode plate and a separator interposed between the positive and negative electrode plates, and the electrode assembly and the electrolyte react with each other to generate electrochemical energy.

In addition, the battery case is sealed by a cap assembly 14. The cap assembly 14 includes a positive electrode terminal 11 and a negative electrode terminal 12 having different polarities, and a vent 13. The vent 13 is a safety member for the battery cells 10 and functions as a passageway for releasing the internal gas generated from the battery cells 10 to the outside. The positive electrode terminal 11 and the negative electrode terminal 12 of the adjoining battery cells 10 may be electrically connected through a bus bar 15, and the bus bar 15 may be fixed by, for example, a nut 16.

The secondary battery module 100 can be used as a power source using the housings 18 and 19 accommodating the plurality of battery cells 10. The housings 18 and 19 may include a pair of end plates 18 arranged to face each other from exterior sides of the battery cells 10, and side surface plates 19 connecting the pair of end plates 18. The plurality of battery cells 10 may be aligned in one direction so as to face one another on wider surfaces, and the pair of end plates 18 may face each other on the outermost surfaces of the battery cells 10.

The insulation sheet 20 may be interposed between the battery cells 10 and may be horizontally arranged in one direction. In one example embodiment, the insulation sheet 20 is interposed between the plurality of battery cells 10 and includes aerogel for blocking heat transfer between the battery cells 10. The insulation sheet 20 is shaped of a rectangular sheet having long side regions having widths corresponding to those of the two long side regions of each of the battery cells 10 and has a relatively small thickness.

However, in order to prevent the insulation sheet 20 from protruding to the outside of the secondary battery module 100, the insulation sheet 20 may be formed to be smaller than a height of each of the long side regions of each of the battery cells 10. In addition, the insulation sheet 20 may be formed to have a thickness large enough to block heat transfer between the adjoining battery cells 10. Here, the thickness of the insulation sheet 20 may vary depending on the material or particles contained in the insulation sheet 20. For example, according to some example embodiments of the present invention, the insulation sheet 20 may have a thickness of 0.3 mm. For example, if the thickness of the insulation sheet 20 is smaller than 0.3 mm, the insulation sheet 20 may be easily broken due to even mild external shocks. However, if the thickness of the insulation sheet 20 is greater than 0.3 mm, distances between the battery cells 10 may be inordinately increased, thereby increasing the size and/or bulk of the secondary battery module 100.

According to some example embodiments, the insulation sheet 20 includes aerogel as a heat insulating material for blocking heat transfer between the adjoining battery cells 10. The aerogel contains carbon dioxide ($SiO_2$) as a main ingredient. In addition, the insulation sheet 20 includes 80% or more of aerogel particles and a remainder of a binder. According to some example embodiments, the percentage of the aerogel particles in the insulation sheet 20 may be in the range from 80% to 90%. If the percentage of the aerogel particles is less than 80%, the heat transfer blocking efficiency between the adjoining battery cells 10 may not be sufficiently high. If the content of the aerogel particles is greater than 90%, the content of the binder may be relatively small, making it difficult to form the insulation sheet 20.

In addition, the aerogel particles may have a size of 10 μm to 100 μm, and 90% or more of the aerogel particles may include nano-sized pores. Because the insulation sheet 20 may include aerogel particles of which 90% or more are formed of nano-sized pores, the aerogel particles may be quite light in weight and demonstrate excellent insulating performance.

The insulation sheet 20 may be configured such that extremely small pores are formed in nanocomposites connected together by a $SiO_2$ skeletal structure, and air occupies the pores. Because porous layers formed by the air occupying the pores are preserved in the $SiO_2$ nanocomposite pores without being mobilized, the air demonstrating the highest heat insulating property can be used as a heat insulating material.

Table 1 below shows physical properties of an inventive insulation sheet using aerogel as a heat insulating material in comparison with a related art insulation sheet using MICA as a heat insulating material. According to Table 1, the inventive insulation sheet using aerogel and the related art insulation sheet using MICA have the same thickness, that is, 0.3 mm.

TABLE 1

| Thermal Insulating Material | Thermal Conductivity (W/mK) | Specific Heat (J/gK) | Specific Weight (g/cm$^3$) | Combustion Type |
|---|---|---|---|---|
| MICA | 0.159 | 1.224 | 1.351 | Incombustible |
| Aerogel | 0.034 | 0.992 | 0.40 | Incombustible |

As shown in Table 1, a thermal conductivity of the insulation sheet using MICA as a heat insulating material, like the related art insulation sheet, was 0.159 W/mK, and a thermal conductivity of the insulation sheet using aerogel as a heat insulating material, like the inventive insulation sheet, was 0.034 W/mK. That is to say, as illustrated in Table 1, the insulation sheet using aerogel as a heat insulating material may have a reduced thermal conductivity by approximately 20% or greater, compared to the related art insulation sheet using MICA. That is to say, the insulation sheet using aerogel as a heat insulating material, like in the present invention, demonstrates improved heat insulating efficiency by approximately 20% or greater, compared to the insulation sheet using MICA, like the related art insulation sheet.

FIG. 3 illustrates photographs showing evaluation results of heat transfer of the secondary battery module according to some example embodiments of the present invention.

To evaluate the heat insulating efficiency of the secondary battery module according to some example embodiments of the present invention, experiments were carried out in the following manner.

Secondary battery modules each including insulation sheets interposed between a plurality of battery cells were prepared. Here, the battery cells of the respective secondary battery modules had the same battery capacity of 60 Ah. In addition, after the first cells of the respective modules were artificially heated, heat transfer and event occurrence to adjoining second and third cells were evaluated.

Example 1

Aerogel was used as a heat insulating material and an insulation sheet having a thickness of 0.3 mm was used.

Example 2

MICA was used as a heat insulating material and an insulation sheet having a thickness of 0.3 mm was used.

Example 3

Insulation sheets were prepared by forming holes in the insulation sheets of Example 2.

The experimental results are summarized in Tables 2 and 3, below.

TABLE 2

|  | First Cells | Second Cells | Third Cells |
|---|---|---|---|
| Example 1 | Artificial heating | OK | OK |
| Example 2 | Artificial heating | NG | NG |
| Example 3 | Artificial heating | NG | NG |

In Table 2, "OK" refers to heat not being transferred and no event occurring, and "NG" refers to heat being transferred and an event occurring.

Like in Example 1, when insulation sheets using aerogel as a heat insulating material were interposed between the battery cells, the heat generated from the first cells was not transferred to the second and third cells. However, in Examples 2 and 3, in which insulation sheets using MICA as a heat insulating material were interposed between the battery cells, the heat generated from the first cells was transferred to the second and third cells. That is to say, as confirmed from the experiment results, the insulation sheet using aerogel as a heat insulating material demonstrated excellent heat insulating efficiency.

Figure 4:
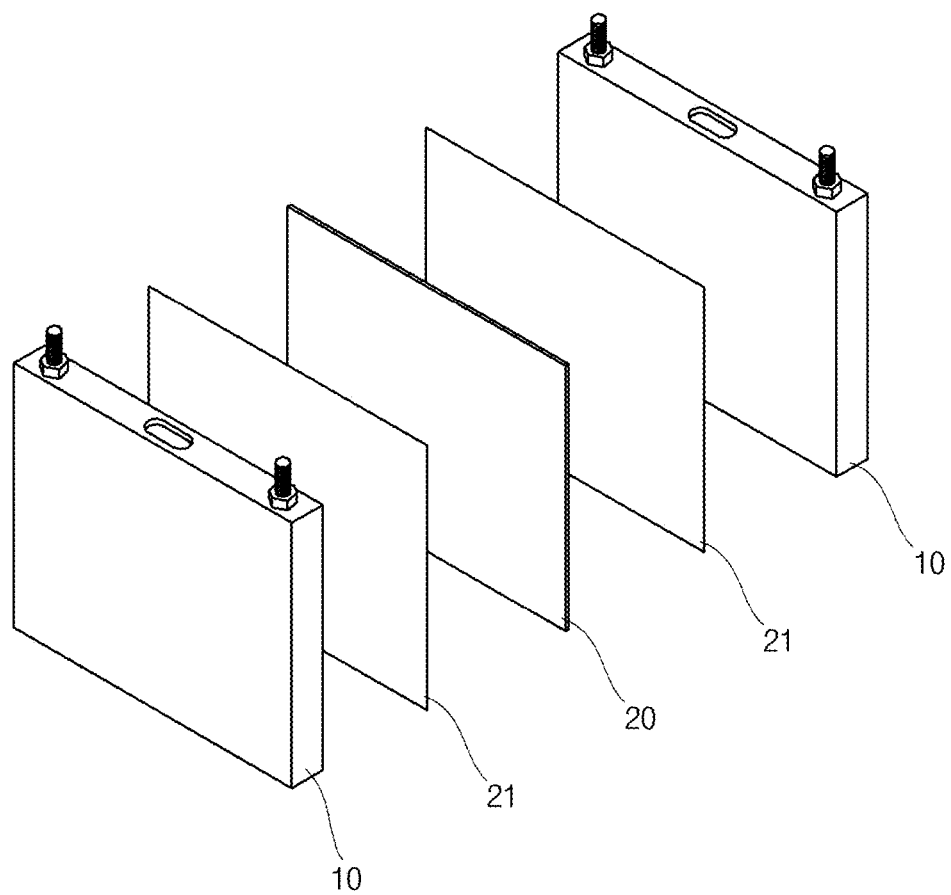
FIG. 4 is a cutaway perspective view illustrating battery cells and insulation sheets according to some example embodiments of the present invention.

FIG. 4 is a cutaway perspective view illustrating battery cells and insulation sheets according to some example embodiments of the present invention.

Referring to FIG. 4, an insulation sheet 20 is interposed between two adjoining battery cells 10. As illustrated in FIG. 4, the insulation sheet 20 is formed to have a size corresponding to the size of each of long side regions that are facing surfaces of the adjoining battery cells 10. In addition, an adhesion tape 21 is taped around an outer surface of the long side region of each of the battery cells 10 facing the insulation sheet 20. Because the adhesion tape 21 is taped around the outer surface of the long side region of each of the battery cells 10, wide surfaces of the insulation sheet 20 are fixedly adhered to the long side regions of the adjoining battery cells 10. Here, the adhesion tape 21 may be made of polyimide (PI).

Meanwhile, the adhesion tape 21 has a higher thermal conductivity than the insulation sheet 20. For example, while the thermal conductivity of the insulation sheet 20 may be 0.034 W/mK, the thermal conductivity of the adhesion tape 21 made of polymide may range from 0.28 to 0.34 W/mK. That is to say, the thermal conductivity of the adhesion tape 21 may be approximately 8 to 10 times higher than that of the insulation sheet 20. Therefore, in order to maximize or increase the heat insulating efficiency, the thickness of the adhesion tape 21 having a relatively high thermal conductivity may be smaller than that of the insulation sheet 20. The adhesion tape 21 and the insulation sheet 20 may be formed in a thickness ratio of 1:3.5. For example, the insulation sheet 20 may be formed to have a thickness of 0.3 mm, while the adhesion tape 21 may be formed to have a thickness of 0.085 mm. If the thickness of the adhesion tape 21 is smaller than 0.085 mm, the adhesiveness of the adhesion tape 21 may be relatively low, making it difficult to adhere the insulation sheet 20 to a region between the battery cells 10. If the thickness of the adhesion tape 21 is greater than 0.085 mm, the heat insulating efficiency of the insulation sheet 20 may be undesirably lowered.

In addition, the insulation sheet 20 may be formed to be in 1.1% volume relative to the battery cells 10. Here, the greater the volume of the insulation sheet 20, the higher the heat transfer blocking efficiency between the battery cells 10. However, if the volume of the insulation sheet 20 is increased, the secondary battery module 100 may become bulky. Therefore, the volume of the insulation sheet 20 may be 1.1% of the volume of the battery cells 10.

Generally, the secondary battery module 100 includes the plurality of battery cells 10, which may generate a large amount of heat while charging and discharging. This may cause thermal runaway in the battery cells 10 to melt separators constituting electrode assemblies of the battery cells 10, which may result in a direct contact between the positive electrode plate and the negative electrode plate, thereby causing short-circuits of the battery cells 10. In addition, the generated heat of a high temperature may be transferred to an adjoining or adjacent battery cell and lead to a problem of consecutive explosions of the arranged battery cells. In addition, in the course of assembling the secondary battery module 100, metallic foreign materials, which are nearly invisible by the naked eye, may be frequently inserted into gaps between the battery cells 10. Accordingly, while the secondary battery module 100 is in use, scratches may be generated on surfaces of the battery cells 10 due to vibrations or impacts to cause short-circuits by insulation breakdown occurring to the surfaces of the battery cells 10.

In the secondary battery module 100 according to some example embodiments of the present invention, the insulation sheet 20 for blocking heat transfer between the adjoining battery cells 10 is provided. The insulation sheet 20 according to some example embodiments of the present invention can prevent or suppress the high-temperature heat generated in a battery cell from being transferred to its adjoining battery cell owing to excellent heat insulating efficiency, which is attributable to nano-sized $SiO_2$ particles holding air layers having heat insulation properties.

In addition, because the insulation sheet 20 includes extremely small pores capable of holding air layers, the secondary battery module 100 according to some example embodiments of the present invention can reduce the weight of the aerogel insulation sheet and can demonstrate excellent insulating performance using a lightweight heat insulating material.

While the secondary battery module of the present invention has been particularly shown and described with reference to example embodiments thereof, it will be understood by those of ordinary skill in the art that various changes in form and details may be made therein without departing from the spirit and scope of the present invention as defined by the following claims, and their equivalents.

What is claimed is:

1. A secondary battery module comprising:
    a plurality of battery cells aligned along one direction;
    a plurality of insulation sheets, wherein the plurality of insulation sheets are arranged between corresponding ones of the plurality of battery cells, the plurality of insulation sheets including aerogel for blocking heat transfer between the plurality of battery cells;
    a housing fixing the battery cells and the insulation sheets; and
    an adhesion tape between the battery cells and the insulation sheets, wherein a thermal conductivity of the adhesion tape is 8 to 10 times higher than that of the insulation sheet.

2. The secondary battery module of claim 1, wherein a percentage of aerogel particles in the insulation sheets ranges from 80% to 90% of a content of the insulation sheets.

3. The secondary battery module of claim 1, wherein aerogel particles in the insulation sheets comprise silicon dioxide ($SiO_2$), and the aerogel particles have a size ranging from 10 μm to 100 μm.

4. The secondary battery module of claim 3, wherein the aerogel particles include nano-sized pores.

5. The secondary battery module of claim 1, wherein each of the insulation sheets has a thickness of 0.3 mm.

6. The secondary battery module of claim 1, wherein the adhesion tape and the insulation sheet are formed in a thickness ratio of 1:3.5.

7. The secondary battery module of claim 1, wherein the insulation sheets are formed to be in 1.1% volume relative to the battery cells.

* * * * *